US009473462B2

(12) United States Patent
Kane (10) Patent No.: US 9,473,462 B2
(45) Date of Patent: Oct. 18, 2016

(54) METHOD AND SYSTEM FOR CONFIGURING AND SECURING A DEVICE OR APPARATUS, A DEVICE OR APPARATUS, AND A COMPUTER PROGRAM PRODUCT

(71) Applicant: QIP SOLUTIONS LIMITED, Bournemouth (GB)

(72) Inventor: Fiona Kane, Bath (GB)

(73) Assignee: QIP SOLUTIONS LIMITED, Bournemouth (GB)

( * ) Notice: Subject to any disclaimer, the term of this patent is extended or adjusted under 35 U.S.C. 154(b) by 0 days.

(21) Appl. No.: 14/927,518

(22) Filed: Oct. 30, 2015

(65) Prior Publication Data

US 2016/0156590 A1 Jun. 2, 2016

(30) Foreign Application Priority Data

Nov. 28, 2014 (GB) .................................. 1421121.3

(51) Int. Cl.
*G06F 9/00* (2006.01)
*H04L 29/06* (2006.01)
*H04L 29/08* (2006.01)
(Continued)

(52) U.S. Cl.
CPC ........... *H04L 63/029* (2013.01); *G06F 21/577* (2013.01); *G06F 21/70* (2013.01); *H04L 63/0272* (2013.01); *H04L 63/0428* (2013.01); *H04L 63/0807* (2013.01); *H04L 63/102* (2013.01); *H04L 67/025* (2013.01); *H04L 67/303* (2013.01); *H04L 67/34* (2013.01)

(58) Field of Classification Search
CPC .................................................. H04L 63/0272

USPC ...................................................... 726/11–15
See application file for complete search history.

(56) References Cited

U.S. PATENT DOCUMENTS

2004/0223500 A1* 11/2004 Sanderson .......... H04L 12/4641
370/395.53
2005/0132229 A1 6/2005 Zhang et al.
(Continued)

FOREIGN PATENT DOCUMENTS

| EP | 1911192 | 4/2008 |
| EP | 2061205 | 5/2009 |
| EP | 2268071 | 12/2010 |

OTHER PUBLICATIONS

Narayan et al., "Network Performance Analysis of VPN Protocols: An Empirical Comparison on Different Operating Systems," Networks Security, Wireless Communications and Trusted Computing, 2009. NSWCTC '09. International Conference on Year: 2009, vol. 1 pp. 645-648.*

(Continued)

*Primary Examiner* — Roderick Tolentino
(74) *Attorney, Agent, or Firm* — CipherLaw (57) ABSTRACT

A computer-implemented method for configuring and securing a first device, the method including performing a first check of the first device to determine the presence of unauthorized components or modules in a memory of the first device, performing a second check of the device to compare hardware components of the first device against a predetermined list of authorized components, initiating an encrypted virtual private network (VPN) tunnel between the first device and a second device that is remote from the first device by transmitting a request from the first device to the second device including data representing multiple parameters associated with the first device.

29 Claims, 4 Drawing Sheets

(51) Int. Cl.
*G06F 21/57* (2013.01)
*G06F 21/70* (2013.01)

(56) References Cited

U.S. PATENT DOCUMENTS

| | | | | |
|---|---|---|---|---|
| 2007/0271606 | A1* | 11/2007 | Amann | H04W 12/02 726/15 |
| 2009/0025080 | A1* | 1/2009 | Lund | H04L 9/3273 726/15 |
| 2009/0175280 | A1* | 7/2009 | Berechya | H04L 12/4625 370/395.53 |
| 2009/0316709 | A1* | 12/2009 | Polcha | H04N 21/2381 370/401 |
| 2010/0034207 | A1* | 2/2010 | Mcgrew | H04L 45/50 370/401 |
| 2011/0066841 | A1* | 3/2011 | Goodrow | H04L 43/0894 713/150 |
| 2012/0002813 | A1* | 1/2012 | Wei | H04L 63/0272 380/270 |
| 2012/0124660 | A1* | 5/2012 | Wang | H04L 12/4641 726/12 |
| 2012/0266231 | A1* | 10/2012 | Spiers | H04L 63/0218 726/12 |
| 2013/0219469 | A1 | 8/2013 | Peterson et al. | |

OTHER PUBLICATIONS

Mao et al., "A Comparative Research on SSL VPN and IPSec VPN," Wireless Communications, Networking and Mobile Computing (WiCOM), 2012 8th International Conference on Year: 2012 pp. 1-4.*

Search Report in GB 1421121.3 dated Mar. 24, 2015.

* cited by examiner

Figure 4 ced data packets representing respective portions of application data for an application for performing the predefined task from the second device to the first device using the VPN tunnel The first and second checks can be initiated in response to predefined event. The predefined event can include execution of a predefined install routine. For example, an installation medium can be introduced to the first device for execution, and the install routine can automatically execute in memory of the first device upon its introduction. The second check can be performed concurrently with, before or after the first check. The multiple parameters associated with the first device include an IP address, netmask and gateway of the first device. Other such suitable parameters, which are unique to the first device, can also be used as will be appreciated. The second device can be preconfigured with data representing the multiple parameters associated with the first device, whereby to enable the second device to confirm the validity of the multiple parameters transmitted by the first device. Determining, at the second device, whether the multiple parameters associated with the first device correspond to a known and trusted device can include comparing the parameters, portions of the parameters, or a hash of one or more of the parameters with a preconfigured listing of the multiple parameters. The method can include transmitting data representing a token from the first device to the second device. The method can include monitoring the first device to determine the presence or addition of one or more additional hardware components. Addition of the or each additional hardware component can trigger a signal from the first device to the second device. The first device can be disabled or otherwise deactivated in response to receipt of the signal at the second device. The first device can be monitored at the second device in response to receipt of the signal at the second device. The method can include deleting or obfuscating data present at a storage location of the first device before the first check. The method can include encrypting a storage location of the first device. The first device can be a DNS server, and the predefined task can therefore be to serve DNS requests received at the first device.

METHOD AND SYSTEM FOR CONFIGURING AND SECURING A DEVICE OR APPARATUS, A DEVICE OR APPARATUS, AND A COMPUTER PROGRAM PRODUCT

CROSS-REFERENCE TO RELATED APPLICATIONS

This application claims the benefit of and priority to United Kingdom patent application no. GB 1421121.3 filed Nov. 28, 2014, under 35 U.S.C. §119, the contents of which are incorporated by reference herein in their entirety.

TECHNICAL FIELD

Aspects relate, in general, to a method and system for configuring and securing a device or apparatus, and to first and second devices or apparatus and a computer program product.

BACKGROUND

Security is an important issue in the field of computers, networks, and related products. Users and companies or institutions typically have a desire to ensure that their hardware and software products are secure from hackers, viruses, and other similar threats and problems. It is also important that hardware and software is optimized, as best it can be, to enable a task or set of tasks to be performed in the most efficient way possible.

SUMMARY

According to an example, there is provided a computer-implemented method for configuring and securing a first device, the method including performing a first check of the first device to determine the presence of unauthorised components or modules in a memory of the first device, performing a second check of the device to compare hardware components of the first device against a predetermined list of authorised components, initiating an encrypted virtual private network (VPN) tunnel between the first device and a second device that is remote from the first device by transmitting a request from the first device to the second device including data representing multiple parameters associated with the first device, determining, at the second device, whether the multiple parameters associated with the first device correspond to a known and trusted device; and on the basis of the determination, providing the encrypted VPN tunnel between the first device and a second device, transmitting data representing a first acknowledgement message, on the basis of the first and second checks, from the first device to a second device using the VPN, on receipt of the first acknowledgement message at the second device, transmitting encrypted data packets representing respective portions of an operating system (OS) for the first device from the second device to the first device using the VPN tunnel, for a predefined task conforming operations of the hardware components of the first device according to a set of preferred hardware operations and behaviours for the task, performing a third check of the first device, using the OS, to compare hardware components of the first device against a predetermined list of authorised components, whereby to approve the hardware components of the first device, transmitting, on the basis of the third check, data representing an application request message from the first device to the second device using the VPN tunnel, and on receipt of the application request message at the second device, transmitting encrypted data packets representing respective portions of application data for an application for performing the predefined task from the second device to the first device using the VPN tunnel. The first and second checks can be initiated in response to predefined event. The predefined event can include execution of a predefined install routine. For example, an installation medium can be introduced to the first device for execution, and the install routine can automatically execute in memory of the first device upon its introduction. The second check can be performed concurrently with, before or after the first check. The multiple parameters associated with the first device include an IP address, netmask and gateway of the first device. Other such suitable parameters, which are unique to the first device, can also be used as will be appreciated. The second device can be preconfigured with data representing the multiple parameters associated with the first device, whereby to enable the second device to confirm the validity of the multiple parameters transmitted by the first device. Determining, at the second device, whether the multiple parameters associated with the first device correspond to a known and trusted device can include comparing the parameters, portions of the parameters, or a hash of one or more of the parameters with a preconfigured listing of the multiple parameters. The method can include transmitting data representing a token from the first device to the second device. The method can include monitoring the first device to determine the presence or addition of one or more additional hardware components. Addition of the or each additional hardware component can trigger a signal from the first device to the second device. The first device can be disabled or otherwise deactivated in response to receipt of the signal at the second device. The first device can be monitored at the second device in response to receipt of the signal at the second device. The method can include deleting or obfuscating data present at a storage location of the first device before the first check. The method can include encrypting a storage location of the first device. The first device can be a DNS server, and the predefined task can therefore be to serve DNS requests received at the first device.

According to an example, there is provided a system for remotely configuring and securing a first device, the system operable to perform a first check of the first device to determine the presence of unauthorised components or modules in a memory of the first device, perform a second check of the device to compare hardware components of the first device against a predetermined list of authorised components, initiate an encrypted virtual private network (VPN) tunnel between the first device and a second device that is remote from the first device, the first device being operable to transmit a request to the second device including data representing multiple parameters associated with the first device, determine, at the second device, whether the multiple parameters associated with the first device correspond to a known and trusted device; and on the basis of the determination, provide or generate the encrypted VPN tunnel between the first device and a second device, transmit data representing a first acknowledgement message, on the basis of the first and second checks, from the first device to a second device using the VPN, on receipt of the first acknowledgement message at the second device, transmit encrypted data packets representing respective portions of an operating system (OS) for the first device from the second device to the first device using the VPN tunnel, for a predefined task, conform or otherwise adapt or regulate operations of the hardware components of the first device according to a set of preferred hardware operations and behaviours for the task, perform a third check of the first device, using the OS, to compare hardware components of the first device against a predetermined list of authorised components, whereby to approve the hardware components of the first device, transmit, on the basis of the third check, data representing an application request message from the first device to the second device using the VPN tunnel, and on receipt of the application request message at the second device, transmit encrypted data packets representing respective portions of application data for an application for performing the predefined task from the second device to the first device using the VPN tunnel The first device can initiate performance of the first and second checks are initiated in response to predefined event. The first device can receive data representing an install routine whereby to cause the first device to initiate performance of the first and second checks. The second device can compare the parameters, portions of the parameters, or a hash of one or more of the parameters with a preconfigured listing of the multiple parameters. The first device can transmit data representing a token to the second device. The second device can monitor the first device to determine the presence or addition of one or more additional hardware components. The first device can transmit a signal to the second device in response to the addition of one or more additional hardware components at the first device. The system can disable or otherwise deactivate the first device in response to receipt of the signal at the second device. The second device can disable the first device by transmitting data to the first device operable to disable a network connection of the first device, and/or disable the VPN connection between the first and second devices, and/or delete data representing the application from a storage location of the first device.

According to an example, there is provided a second apparatus for remotely configuring a first apparatus, the second apparatus operable to receive a request from the first apparatus including data representing multiple parameters associated with the first device, determine whether the multiple parameters associated with the first device correspond to a known and trusted device; and on the basis of the determination, provide or generate the encrypted VPN tunnel between the first apparatus and a second apparatus, receive data representing a first acknowledgement message over the VPN tunnel, on the basis of first and second checks performed at the first apparatus, on receipt of the first acknowledgement message at the second apparatus, transmit encrypted data packets representing respective portions of an operating system (OS) for the first apparatus to the first apparatus using the VPN tunnel, receive data representing an application request message from the first apparatus using the VPN tunnel, and on receipt of the application request message at the second device, transmit encrypted data packets representing respective portions of application data for an application for performing the predefined task to the first device using the VPN tunnel.

According to an example, there is provided a first apparatus operable to be remotely configured using a second apparatus such as that described herein, the first apparatus operable to perform a first check of the first apparatus to determine the presence of unauthorised components or modules in a memory of the first apparatus, perform a second check of the apparatus to compare hardware components of the first device against a predetermined list of authorised components, transmit data representing a first acknowledgement message, on the basis of the first and second checks, to the second apparatus using the VPN, for a predefined task, conform or otherwise adapt or regulate operations of the hardware components of the apparatus according to a set of preferred hardware operations and behaviours for the task, perform a third check, using the OS, to compare hardware components of the first apparatus against a predetermined list of authorised components, whereby to approve the hardware components of the first apparatus, and transmit, on the basis of the third check, data representing an application request message to the second apparatus using the VPN tunnel In an example, the first apparatus is operable to be configured by the second apparatus. The first and the second apparatus can be part of the system as described herein.

According to an example, there is provided a first device configured according to a method as described herein.

According to an example, the first device can be configured as a DNS resource, such as a DNS server for example.

The first device can include a processor comprising multiple processing cores, wherein the processor is conformed to maximise the time spent in one state. Respective processing cores can perform a predefined task in the form of processing data representing multiple DNS packets, wherein the first device is configured such that the or each processing core of the first device is conformed or otherwise adapted or regulated to minimise context switching between respective ones of the multiple processing cores, whereby to enable more DNS packets to be processed using the first device.

The first device can include a first port and a second port, wherein the first port is conformed, adapted, modified or otherwise regulated for data ingress to the first device and the second port conformed, adapted, modified or otherwise regulated for data egress from the first device.

The first device can include an internal bus, wherein an internal bus speed of the device is conformed, adapted, modified or otherwise regulated to maximise throughput of the first device.

One or more of the hardware components of the first device can be conformed, adapted, modified or otherwise regulated by adapting a firmware device, such as a BIOS, of the device.

According to an example, there is provided a computer program product, comprising a computer usable medium having computer readable program code embodied therein, said computer readable program code adapted to be executed to implement a method for securing an apparatus as provided herein.

According to an example, there is provided a DNS server apparatus configured according to a method as provided herein.

BRIEF DESCRIPTION OF THE DRAWINGS

Embodiments will now be described, by way of example only, with reference to the accompanying drawings, in which.

DESCRIPTION

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein. The terms device and apparatus are used interchangeably herein, and the use of one over the other is not intended to imply the presence or absence of any one or more features or elements.

Hardware, such as computers and servers for example, and software executing on such hardware can be accessed from locations which are remote from the installation or location in which the hardware is deployed. For example, an initial set up of the hardware and/or software and subsequent interactions can be performed remotely with minimal interaction required locally.

For example, remote access can enable a user to provide support, set-up, configuration and maintenance on hardware and software. This can be convenient or indeed required when complex or secure operations are intended to be executed on hardware, which preferably has the minimum of local interactions. This can reduce the chances of unwanted hardware or software elements being deployed which could compromise the security or integrity of the system in question. A virtual private network (VPN) connection can be used to enable remote users to remotely access a device or apparatus in a secure way. A VPN typically extends a private network across a public network, such as the Internet for example, and enables apparatus to send and receive data across shared or public networks as if it were directly connected to the private network. In doing so, the apparatus can take advantage of the functionality, security and management policies of the private network.

According to an example, a method and system are provided to enable a remote device or apparatus, such as a server or computer for example, to be configured and secured from a remote location. In an example, configuration can include an initial setup of the apparatus and can include optimization for a predefined task or tasks. Securing the apparatus can include restricting access to the apparatus, and removing or disabling hardware and/or software components that may enable the apparatus to be accessed.

According to an example, there is provided a method and system for configuring and securing a remote server (device). In an example the method can be used across multiple applications, as well as clouds applications: web servers, DNS Servers, Anycast Clouds, and so on. A remote device or apparatus such as a server according to an example may or may not be in cloud environment.

Figure 1:
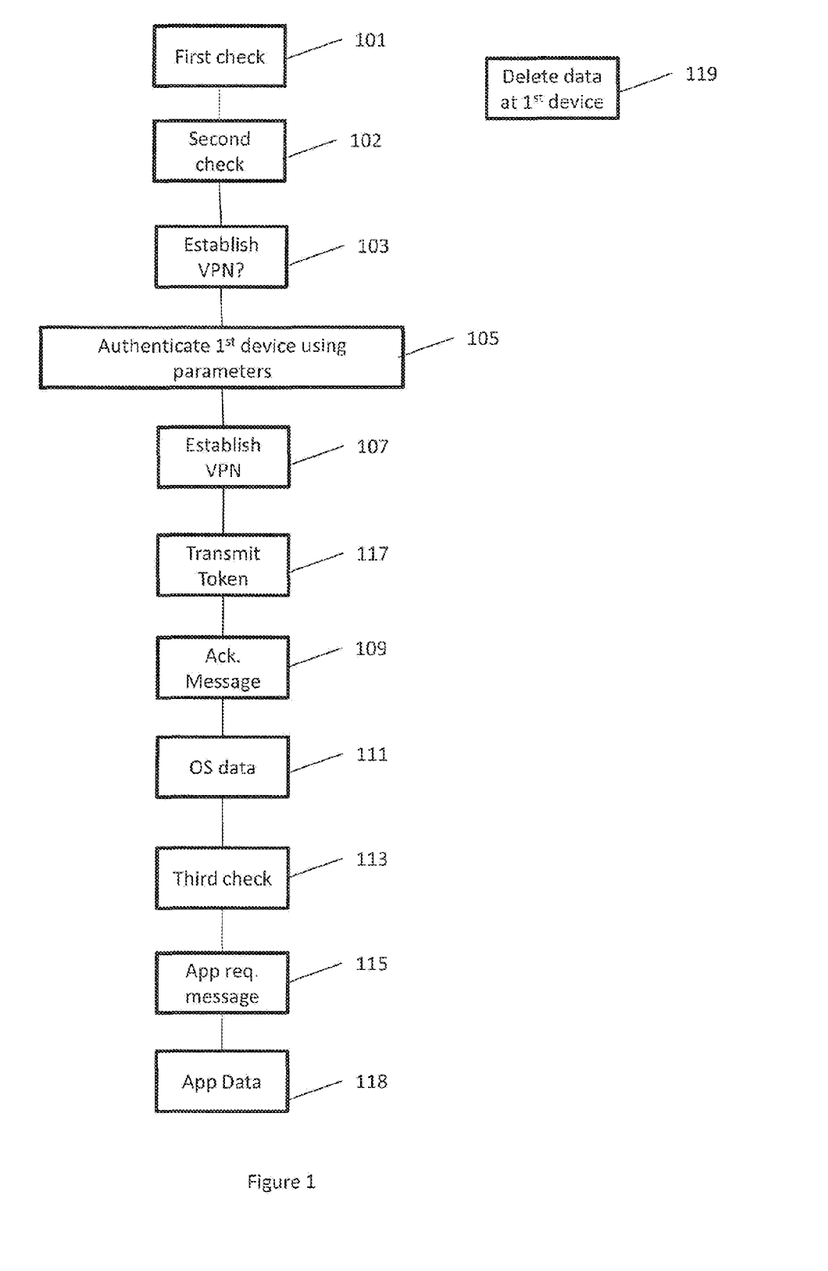
FIG. 1 is a schematic representation of a method according to an example.

FIG. 1 is a schematic representation of a method according to an example. More particularly, the method described with reference to FIG. 1 enables a first device or apparatus to be configured and secured. In block 101 a first check of the first device is performed to determine the presence of unauthorised components or modules in a memory of the first device. More particularly, the specification of the hardware of the first device is compiled and checked against a list of expected hardware in order to determine if there are any hardware elements present that are not expected. In addition, the first device is checked (a second check in block 102) to determine if there are any unexpected software modules present, such as memory mapping modules, backdoors and so on. In an example, the second check can include reformatting all hard disk/storage of the device in order to remove any potentially unauthorised components. Typically, at the stage at which the first check is performed, no operating system (OS) or other software or applications is present or installed in a memory of the first device. Accordingly, a check of the memory (volatile and non-volatile) of the first device can be performed relatively easily in order to determine the presence of unauthorised software components. In an example, the first and second checks can be performed simultaneously or substantially simultaneously, or one after the other.

At block 103 an encrypted virtual private network (VPN) tunnel is initiated between the first device and a second device that is remote from the first device. The second device can be located at a geographically remote location for example, or can be provided in a separate region of the installation or location of the first device. In an example, the tunnel is initiated by transmitting a request from the first device to the second device, which request includes data representing multiple parameters associated with the first device. For example, the request can include a request that a VPN tunnel be set up between the devices, and the parameters can include the IP address and/or netmask and/or gateway and so on of the first device. The second device can check the parameter(s) against a predetermined list of expected results in order to determine if the VPN connection should be made. Accordingly, at block 105 it is determined, at the second device, whether the multiple parameters associated with the first device correspond to a known and trusted device. That is, it is determined if the first device is the device making a request for a VPN connection with the second device. In block 107, on the basis of the determination, an encrypted VPN tunnel between the first device and a second device is established.

In block 109, the first device can transmit data representing a first acknowledgement message, on the basis of the first and second checks, to the second device using the VPN. For example, the first acknowledgement message can indicate that the VPN connection has been successfully established. In an example, the VPN tunnel is encrypted. For example, the first and second devices encrypt the data entering the tunnel and decrypt it at the other end using any one of the multiple known protocols for encrypted VPN connections such as Point-to-Point Tunneling Protocol (PPTP), Layer 2 Tunneling Protocol (L2TP) and Internet Protocol Security (IPsec), or Secure Sockets Layer (SSL) for example.

Upon receipt of the first acknowledgement message at the second device, in block 111 the second device can transmit data packets representing respective portions of an operating system (OS) for the first device to the first device using the VPN tunnel In an example, any features of a typical OS kernel that can be compromised or are not necessary for functionality are removed or have been modified. For example, SMTP Traps or logging capabilities are removed from the OS as they open holes in the security of the system.

According to an example, for a predefined task, operations of the hardware components of the first device are conformed, modified, adapted or tuned according to a set of preferred hardware operations and behaviours for the task. That is, the operations of the hardware are optimized by the OS to suit an application or applications. In an example, this can include the OS performing a check to see if it has a driver for a particular platform or task, and installing one if needed. In an example, is a driver is not present, the OS can modify (optimize) a standard driver to work in the most efficiently way on the platform. At the same time, the first device can provide an error message for transmission to the second device indicating that a new driver is needed because the first device may not be running optimally with the existing (modified) driver.

According to an example, the OS modifies (optimizes) the hardware functionality based upon an application that is running or is to be run. For example, one application can be to run the platform (first device) as an Authoritative DNS server. Such server(s) may get a large number of DNS queries per second, which could be over a 1M queries per second.

Different protocol packets have their own behavioral characteristics and impact the performance of hardware differently. For example, for the DNS protocol, the first part of Layer 3, have very small packets that do not require much processing, with an asymmetric response that is between 3 and 5 times larger than the question. On the other hand, HTTPS, Layer 7, have large HTTP packets, with the cryptographic overhead of the packet requiring more processing then the packet itself. There is significant impact on the CPU, for example, as to how it processes the two different types of packets. In a stressful environment, such as a Distributed Denial of Service (DDoS) attack, any improvement in the performance that is specific to the type of packet will correlate to an increase in packet processing and the ability to defend against such an attack.

In high load situations when dealing with multiple (typically very small) DNS queries, the ability to quickly deal with the queries it is less dependent on processor(s) capacity vs. memory. In fact, having too many cores in a multi-core processor can be a determent because when you switch between cores it takes up valuable resources. Therefore, according to an example, when the first device is operating as a DNS server, the OS can optimise the hardware of the first device to force the or each processor to increase the amount of time each core is actively working in order to minimize switching between cores. Each device can have a certain capacity to process a number of queries per second, primarily based upon the capacity of the processor (among other items). In a processor with multiple cores, switching between the cores is called Context switching and occurs when the task is complete, i.e. processing of a DNS packet. Since DNS packets are small, the amount of time the processor stays in a single state (core) to finish its task is small, with the amount of context switching relatively high compared to the time in each state. Therefore the overhead of the context switching is taking up resources which could be used to process more packets. Therefore, according to an example, the or each processor of the first device can be tuned to increase the amount of time it stays in one state in order to minimize context switching between cores that will allow more packets to be processed.

In an alternative example, if the first device is operable to function as an HTTP or HTTPS server, more processing capability would typically be needed. The hardware of the first device can therefore be optimised to minimise an overall overhead so that HTTP(S) requests can be dealt with more efficiently. For example, any extraneous services not required can be removed or stopped, and a processor can be conformed to prioritise requests which can include not limiting context switching between cores of the processor. Optimisation can be performed with other hardware components as well, and the optimization is application specific.

In block 113 a third check of the first device, using the OS, is performed to compare hardware components of the first device against the predetermined list of authorised components, whereby to approve the hardware components of the first device. In block 115 data representing an application request message from the first device is transmitted to the second device using the VPN tunnel On receipt of the application request message, the second device transmits encrypted data packets representing respective portions of application data for an application for performing the predefined task to the first device using the VPN tunnel in block 118. For example, in the case that the first device is a DNS server, the application request message in block 115 can be a request for a DNS server specific application that enables the first device to function as a DNS server. The predefined task can therefore be processing DNS requests.

In an example, once the initial VPN link and the application has been setup on the first device, the first device can send a unique token (key to the second device (block 117). In the future, if someone downloads or install the application onto another device, spoofs the IP/gateway/netmask and so on, and tries to build a VPN into the second device, the second device can reject the VPN request because the token of the first device that the software was installed on will not match the spoofed device.

According to an example, the first and second checks are initiated in response to predefined event. The predefined event can include execution of a predefined install routine. For example, a predefined install routing can be loaded to a memory of the first device, either remotely, or at the device. Typically, it is envisaged that the install routine will be provided at the device itself The process can therefore be started locally at the device, and the remainder of the processes can be executed without intervention.

According to an example, the first device can be monitored in order to determine the presence or addition of one or more additional hardware components. For example, the addition of a keyboard and/or mouse for example will typically trigger certain routines within the device in order to enable the hardware to be used. The hardware can therefore be detected, and the second device can be informed that extra hardware has been added to the first device. In response, the first device can be disabled in response to receipt of a signal at the second device indicating the addition of unauthorised hardware. In an example, a 'kill switch' that will shut down the OS and render the system of the device inoperable can be used, and so that the only way to bring the device back up is to re-install the OS and go through the process as described. That is, the OS of the first device can be shut down or rendered inoperable as soon as an unauthorised hardware device is detected. Alternatively, the second device can transmit a signal to the first device in response to receipt of the signal at the second device indicating the addition of unauthorised hardware in order to cause the OS of the first device can be shut down or rendered inoperable. For example, a network connection can be disabled, and the OS can implement a process to remove (such as by deleting) one or more components of the OS and/or an application of the first device to cause the OS and/or the application to become inoperable and inaccessible.

In an example, any storage devices such as hard drives and so on can be encrypted with AES256 and each with a different key so if someone were to remove them from a device they would be inaccessible.

Figure 2:
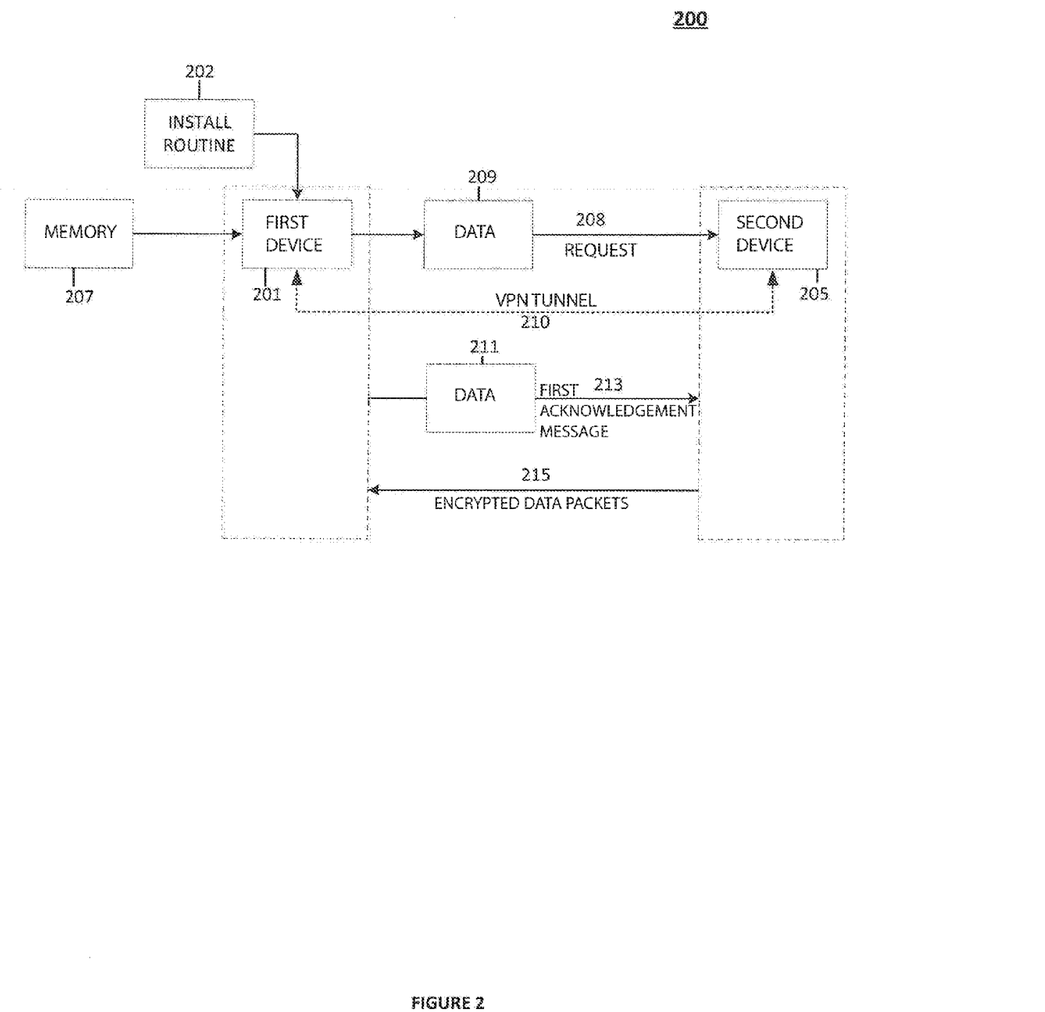
FIG. 2 is a schematic representation of a system according to an example.

In block 119 data present at a storage location (which can be encrypted) of the first device can be deleted or obfuscated before (or indeed after) the first check. FIG. 2 is a schematic representation of a system according to an example. The system 200 is operable to enable the first device 201 to be configured and secured from a remote location using a second device 205. In response to a predefined install routine being introduced or executed at the first device 201, such as by introduction of a software media to the device for example, a first check of the first device to determine the presence of unauthorised components or modules in a memory 207 of the first device 201. In an example, the check is performed using install routine 202, and can determine the presence of unauthorised modules as noted above. A second check of the device is performed in order to compare hardware components of the first device against a predetermined list of authorised components. In an example, the list of authorised components can be stored remotely, such as at the second device 205 for example, or can be encoded in the install routine. Similar considerations apply to a set of authorised (or unauthorised modules). If stored remotely, the checks can include transmitting data representing a list of components (such as hardware and/or software components) of the first device 201 to the second device 205 to enable the list to be checked against a predefined list of authorised components.

If any unauthorised component is detected or discovered, the second device 205 can transmit a signal to the first device 201 to cause the process to stop.

The first device 201 can transmit a request 208 to the second device including data 209 representing multiple parameters associated with the first device, such as an IP address of the first device and so on for example. The request 208 is a request for establishment of an encrypted virtual private network (VPN) tunnel 210 between the first device 201 and the second device 205. By virtue of an encrypted VPN tunnel between the devices, data communications between the devices are encrypted. The actual data need not be encrypted itself, but may be if desired.

The second device is operable to determine whether the multiple parameters 209 associated with the first device correspond to a known and trusted device, and on the basis of the determination, provide, generate or establish the encrypted VPN tunnel between the first device and a second device. The first device can transmit data 211 to the second device representing a first acknowledgement message on the basis of the first and second checks, using the VPN, for example to confirm that the first and second checks have been performed and that the first device is ready to receive data for an OS. On receipt of the first acknowledgement message 213 at the second device 205, the second device transmits encrypted data packets 215 representing respective portions of an operating system (OS) for the first device using the VPN tunnel The OS can be installed on the first device, and for a predefined task, the OS can conform, modify, tune or otherwise adapt or regulate operations of the hardware components of the first 201 device according to a set of preferred hardware operations and behaviours for the task. As noted above for example, if the first device is a DNS server, a processor of the device can be tuned to minimise context switching between cores of the processor.

A third check of the first device, using the OS, can be performed to compare hardware components of the first device against a predetermined list of authorised components, whereby to approve the hardware components of the first device, particularly following an optimisation of the hardware of the device.

On the basis of the third check, data representing an application request message can be transmitted from the first device to the second device using the VPN tunnel, and on receipt of the application request message at the second device, encrypted data packets representing respective portions of application data for an application for performing the predefined task can be sent from the second device to the first device using the VPN tunnel.

Figure 3:
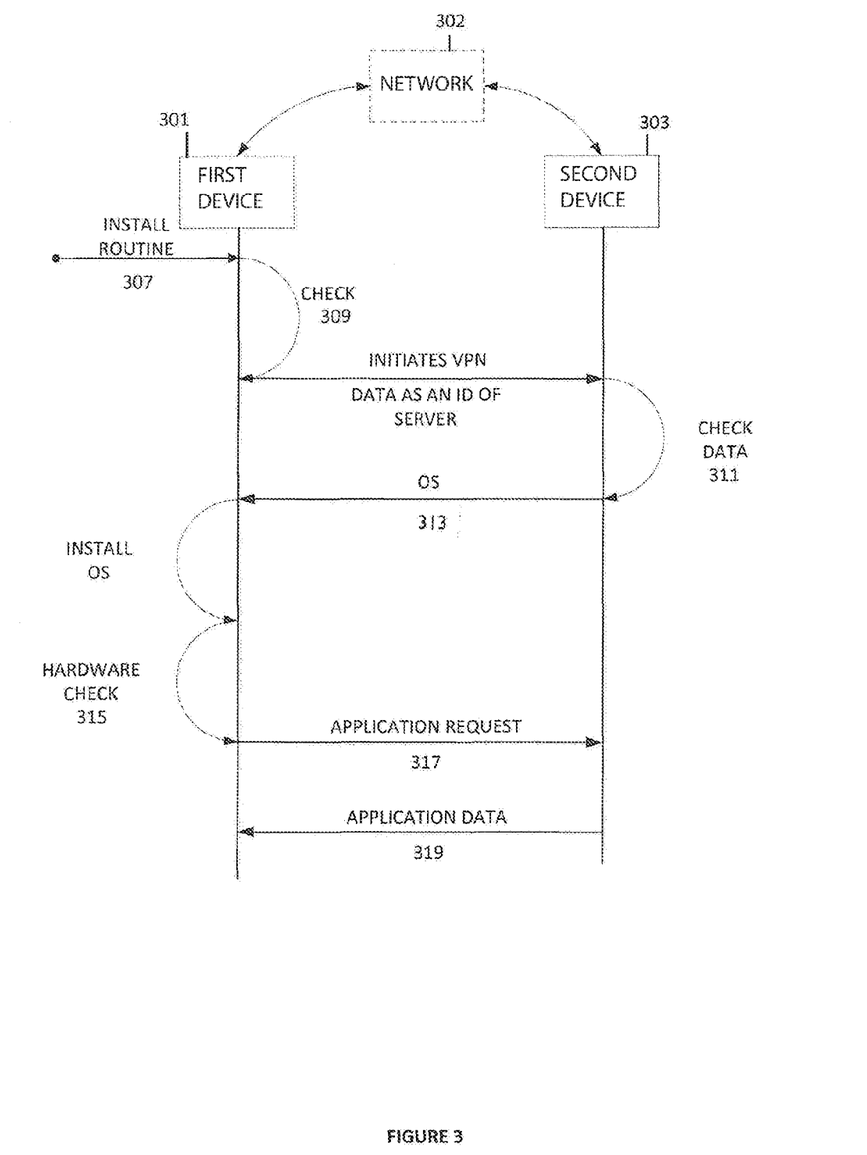
FIG. 3 is a schematic representation of a process flow according to an example.

FIG. 3 is a schematic representation of a process flow according to an example. A first device 301 and a second device 303 are provided, and are operable to communicate with one another over a network 302, such as the internet for example. The second device 303 is geographically remotely located from the first device 301. Upon initiation of an install routine 307 at the first device 301 a first and a second check 309 of the first device 301 is performed to determine the presence of unauthorised components or modules in a memory of the first device, and to compare hardware components of the first device against a predetermined list of authorised components. An encrypted virtual private network (VPN) tunnel between the first device 301 and a second device 303 is initiated by transmitting a request from the first device to the second device including data representing multiple parameters associated with the first device. At the second device, a check 311 as to whether the multiple parameters associated with the first device correspond to a known and trusted device is performed, and on the basis of the determination, the second device can establish the encrypted VPN tunnel between the first device and a second device. That is, in an example, the first device 301 can request a VPN be set up, but the second device 303 is the only device capable of established such a connection once it is satisfied that the credentials of the first device are valid and that the checks show no unauthorised components (hardware or software). A first acknowledgement message can be transmitted from the first device to the first device, on the basis of the first and second checks.

On receipt of the first acknowledgement message at the second device 303, data packets representing respective portions 313 of an operating system (OS) for the first device can be transmitted from the second device to the first device using the VPN tunnel The data packets are effectively encrypted by virtue of the communication using the encrypted VPN tunnel, but in an example the packets may not be themselves encrypted. The OS is installed by the first device 301.

For a predefined task operations of the hardware components of the first device 301 are conformed, modified or tuned according to a set of preferred hardware operations and behaviours for the task. A third check 315 of the first device, using the OS, can be performed to compare hardware components of the first device against a predetermined list of authorised components, whereby to approve the hardware components of the first device.

On the basis of the third check, data representing an application request message 317 can be transmitted from the first device to the second device using the VPN tunnel On receipt of the application request message at the second device 303, data packets representing respective portions of application data 319 for an application for performing the predefined task can be transmitted from the second device to the first device using the VPN tunnel The application can be installed on the first device 301.

Thus, there is provided secure and resilient configuration of a device that can be tuned to perform optimally for a given task.

According to an example, further hardware optimizations can be performed. For example, communications channels of the first device can be optimized to maximize the data ingress and egress rates of the device and/or to maximize (optimize) the bus speed, such as at the BIOS level of the device for example.

Figure 4:
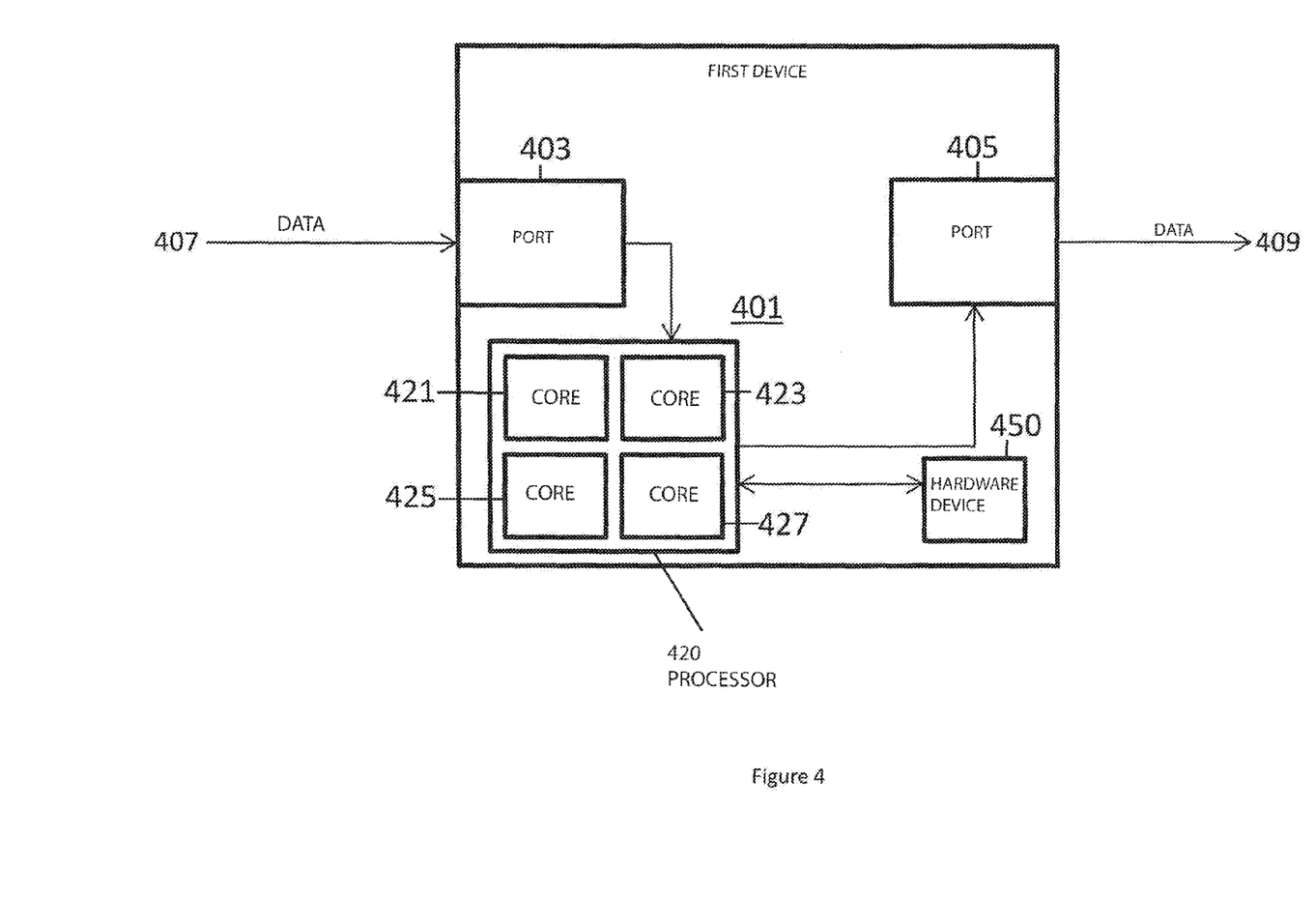
FIG. 4 is a schematic representation of a first device according to an example.

FIG. 4 is a schematic representation of a first device according to an example. The first device or apparatus 401, which can be a server for example, has two Ethernet Ports 403 and 405. Typically in most deployment scenarios one port is used for actual use and the other is a back-up port.

In an example that the first device 401 functions as a DNS resource, the utilization of the ports of the device can be optimized based up on the asymmetry between the 'question' (data ingress, 407) and the 'response' (data egress, 409) from the device for DNS data. Because DNS queries 407 are typically small, they are allocated to Eth(0) port 403, which can also be used for platform updates, administration overhead, etc. while the DNS responses (egress) 409, which are typically larger can be allocated to the outward port 405. Based upon the load, the resources can be allocated across the ports.

In an example, if only one port is used, then the system can continue to function over that port.

Accordingly, the first device is modified in order to optimize the ports of the device for the predefined task, thereby resulting in a faster and more efficient machine. The same considerations apply to that described above in connection with minimization of context switching between cores of a processor of the device.

In an example therefore, the first device operates in a new way compared to the case in which it were deployed, as a DNS server for example, without modification or optimisation. Thus, the or each modification or optimisation makes the device better in the sense of running more efficiently and effectively as a device, particularly for the predefined task for which it has been modified. Each modification noted herein can be implemented independently of the others, or selected ones can be implemented together as desired.

In the example of FIG. 4, processor 420 of device 401 is depicted with multiple cores 421, 423, 425, 427. The processor can receive input from port 403, such as data 407, process the data using one or more of the cores, and output the data to port 405 (data 409). The device 401 can be optimized to execute the task of operating as a DNS server more efficiently and effectively by minimising context switching between the cores of the processor 420, in addition to, or independently, from the other optimizations noted. Other hardware elements of device 401 have been omitted for clarity, but it will be appreciated that various other components such as memory, buses, storage devices and so on can be provided.

According to an example, the internal bus speed of the device can be optimized, such as at the BIOS level of the device. In an example, the OS executing on the device can maximize the BUS speed within the device, thereby maximizing the throughput of the device, which can be advantageous when the device acts as a server for example.

In an example, an optimization can be implemented by the installed OS and/or the application modifying the BIOS of the device in order to confirm, regulate or tune hardware operations of the device so that the device performs in a faster and more efficient way. In an example, the optimizations can be provided by way of a hardware element, such as a pre-programmed device operable to cooperate with processor 420 for example.

According to an example, a system for remotely securing a first device is provided in which the system can perform a first check of the first device to determine the presence of unauthorised components or modules in a memory of the first device, perform a second check of the device to compare hardware components of the first device against a predetermined list of authorised components, initiate an encrypted virtual private network (VPN) tunnel between the first device and a second device that is remote from the first device, the first device being operable to transmit a request to the second device including data representing multiple parameters associated with the first device, determine, at the second device, whether the multiple parameters associated with the first device correspond to a known and trusted device; and on the basis of the determination, provide or generate the encrypted VPN tunnel between the first device and a second device, transmit data representing a first acknowledgement message, on the basis of the first and second checks, from the first device to a second device using the VPN, on receipt of the first acknowledgement message at the second device, transmit encrypted data packets representing respective portions of an operating system (OS) for the first device from the second device to the first device using the VPN tunnel, perform a third check of the first device, using the OS, to compare hardware components of the first device against a predetermined list of authorised components, whereby to approve the hardware components of the first device,. and transmit, on the basis of the third check, data representing an application request message from the first device to the second device using the VPN tunnel, and on receipt of the application request message at the second device, transmit encrypted data packets representing respective portions of application data for an application for performing a predefined task from the second device to the first device using the VPN tunnel.

Thus, a secure device or apparatus (first device) can be configured using a remote device or apparatus (second device).

Operations of the hardware components of the first device can be conformed or otherwise adapted or regulated according to a set of preferred hardware operations and behaviours for the task.

The invention claimed is:

1. A computer-implemented method for configuring and securing a first device, the method including:
    performing a first check of the first device to determine the presence of unauthorised components or modules in a memory of the first device;

performing a second check of the device to compare hardware components of the first device against a predetermined list of authorised components;

initiating an encrypted virtual private network (VPN) tunnel between the first device and a second device that is remote from the first device by transmitting a request from the first device to the second device including data representing multiple parameters associated with the first device;

determining, at the second device, whether the multiple parameters associated with the first device correspond to a known and trusted device; and on the basis of the determination, providing the encrypted VPN tunnel between the first device and a second device;

transmitting data representing a first acknowledgement message, on the basis of the first and second checks, from the first device to a second device using the VPN;

on receipt of the first acknowledgement message at the second device, transmitting encrypted data packets representing respective portions of an operating system (OS) for the first device from the second device to the first device using the VPN tunnel;

for a predefined task conforming operations of the hardware components of the first device according to a set of preferred hardware operations and behaviours for the task;

performing a third check of the first device, using the OS, to compare hardware components of the first device against a predetermined list of authorised components, whereby to approve the hardware components of the first device;

transmitting, on the basis of the third check, data representing an application request message from the first device to the second device using the VPN tunnel; and on receipt of the application request message at the second device, transmitting encrypted data packets representing respective portions of application data for an application for performing the predefined task from the second device to the first device using the VPN tunnel.

2. The method as claimed in claim 1, wherein the first and second checks are initiated in response to predefined event.

3. The method as claimed in claim 2, wherein the predefined event includes execution of a predefined install routine.

4. The method as claimed in claim 1, wherein the second check is performed concurrently with, before or after the first check.

5. The method as claimed in claim 1, wherein the multiple parameters associated with the first device include an IP address, netmask and gateway of the first device.

6. The method as claimed in claim 1, wherein the second device is preconfigured with data representing the multiple parameters associated with the first device, whereby to enable the second device to confirm the validity of the multiple parameters transmitted by the first device.

7. The method as claimed in claim 1, wherein determining, at the second device, whether the multiple parameters associated with the first device correspond to a known and trusted device includes comparing the parameters, portions of the parameters, or a hash of one or more of the parameters with a preconfigured listing of the multiple parameters.

8. The method as claimed in claim 1, further including, transmitting data representing a token from the first device to the second device.

9. The method as claimed in claim 1, further including monitoring the first device to determine the presence or addition of one or more additional hardware components.

10. The method as claimed in claim 9, wherein addition of the or each additional hardware component triggers a signal from the first device to the second device.

11. The method as claimed in claim 10, wherein the first device is disabled in response to receipt of the signal at the second device.

12. The method as claimed in claim 10, wherein the first device is monitored at the second device in response to receipt of the signal at the second device.

13. The method as claimed in claim 1, further including: deleting or obfuscating data present at a storage location of the first device before the first check.

14. The method as claimed in claim 1, wherein the first device is a DNS server, and the predefined task is to serve DNS requests received at the first device.

15. A system for remotely configuring and securing a first device, the system comprising:
a first device comprising a processor and a memory, the processor comprising at least one processing core;
a second device that is remote from the first device and comprising a processor and a memory, the processor comprising at least one processing core;
wherein the first device is configured to:
perform a first check of the first device to determine the presence of unauthorised components or modules in the memory of the first device;
perform a second check of the first device to compare hardware components of the first device against a predetermined list of authorised components; and
initiate an encrypted virtual private network (VPN) tunnel between the first device and the second device, the first device being operable to transmit a request to the second device including data representing multiple parameters associated with the first device;
wherein the second device is configured to:
determine whether the multiple parameters associated with the first device correspond to a known and trusted device; and on the basis of the determination, provide or generate the encrypted VPN tunnel between the first device and a second device;
wherein the first device is further configured to transmit data representing a first acknowledgement message, on the basis of the first and second checks, from the first device to a second device using the VPN;
wherein the second device is further configured to on receipt of the first acknowledgement message at the second device, transmit encrypted data packets representing respective portions of an operating system (OS) for the first device from the second device to the first device using the VPN tunnel;
wherein the first device is further configured to:
for a predefined task, conform or otherwise adapt or regulate operations of the hardware components of the first device according to a set of preferred hardware operations and behaviours for the task;
perform a third check of the first device, using the OS, to compare hardware components of the first device against a predetermined list of authorised components, whereby to approve the hardware components of the first device;
transmit, on the basis of the third check, data representing an application request message from the first device to the second device using the VPN tunnel; and wherein the second device is further configured to on receipt of the application request message at the second device, transmit encrypted data packets representing respective portions of application data for an application for performing the predefined task from the second device to the first device using the VPN tunnel.

16. The system as claimed in claim 15, wherein the first device is operable to initiate performance of the first and second checks are initiated in response to predefined event.

17. The system as claimed in claim 16, wherein the first device is operable to receive data representing an install routine whereby to cause the first device to initiate performance of the first and second checks.

18. The system as claimed in claim 15, wherein the second device is operable to:
compare the parameters, portions of the parameters, or a hash of one or more of the parameters with a preconfigured listing of the multiple parameters.

19. The system as claimed in claim 15, wherein the first device is operable to transmit data representing a token to the second device.

20. The system as claimed in claim 15, wherein the second device is operable to monitor the first device to determine the presence or addition of one or more additional hardware components.

21. The system as claimed in claim 20, wherein the first device is configured to transmit a signal to the second device in response to the addition of one or more additional hardware components at the first device.

22. The system as claimed in claim 21, wherein the system is operable to disable the first device in response to receipt of the signal at the second device.

23. The system as claimed in claim 22, wherein the second device is operable to disable the first device by transmitting data to the first device operable to: disable a network connection of the first device, and/or disable the VPN connection between the first and second devices, and/or delete data representing the application from a storage location of the first device.

24. A second apparatus for remotely configuring a first apparatus, the second apparatus comprising:
a processor comprising at least one processing core and a memory, the processor configured to:
receive a request from the first apparatus including data representing multiple parameters associated with the first device;
determine whether the multiple parameters associated with the first device correspond to a known and trusted device; and on the basis of the determination, provide or generate the encrypted VPN tunnel between the first apparatus and a second apparatus;
receive data representing a first acknowledgement message over the VPN tunnel, on the basis of first and second checks performed at the first apparatus;
on receipt of the first acknowledgement message at the second apparatus, transmit encrypted data packets representing respective portions of an operating system (OS) for the first apparatus to the first apparatus using the VPN tunnel;
receive data representing an application request message from the first apparatus using the VPN tunnel; and
on receipt of the application request message at the second device, transmit encrypted data packets representing respective portions of application data for an application for performing the predefined task to the first device using the VPN tunnel;
wherein the first apparatus has been configured to be remotely configured using the second apparatus, the first apparatus having been further configured to:
perform a first check of the first apparatus to determine the presence of unauthorised components or modules in a memory of the first apparatus;
perform a second check of the apparatus to compare hardware components of the first device against a predetermined list of authorised components;
transmit data representing a first acknowledgement message, on the basis of the first and second checks, to the second apparatus using the VPN;
for a predefined task, conform or otherwise adapt or regulate operations of the hardware components of the apparatus according to a set of preferred hardware operations and behaviours for the task;
perform a third check, using the OS, to compare hardware components of the first apparatus against a predetermined list of authorised components, whereby to approve the hardware components of the first apparatus; and
transmit, on the basis of the third check, data representing an application request message to the second apparatus using the VPN tunnel.

25. The first device as claimed in claim 24, wherein the first device is configured as a DNS resource.

26. The first device as claimed in claim 24, the first device including a processor comprising multiple processing cores, wherein the processor is conformed, adapted, modified or otherwise regulated to maximise the time spent in one state.

27. The first device as claimed in claim 26, wherein respective processing cores are operable to perform a predefined task in the form of processing data representing multiple DNS packets, wherein the first device is configured such that the or each processing core of the first device is conformed or otherwise adapted or regulated to minimise context switching between respective ones of the multiple processing cores, whereby to enable more DNS packets to be processed using the first device.

28. The first device as claimed in claim 24, wherein the first device includes a first port and a second port, wherein the first port is conformed, adapted, modified or otherwise regulated for data ingress to the first device and the second port is conformed, adapted, modified or otherwise regulated for data egress from the first device.

29. The first device as claimed in claim 24, wherein one or more of the hardware components of the first device are conformed, adapted, modified or otherwise regulated by adapting or modifying a firmware device, such as a BIOS, of the device.

* * * * *